United States Patent Office 3,035,898
Patented May 22, 1962

3,035,898
METHOD FOR PREPARING POTASSIUM PHOSPHATES
Arthur N. Baumann, Lakeland, Fla., assignor to International Minerals & Chemical Corporation, a corporation of New York
No Drawing. Filed Dec. 30, 1957, Ser. No. 705,778
13 Claims. (Cl. 23—107)

This invention relates to the manufacture of crystalline potassium phosphate compounds suitable for use as a detergent. More particularly, this invention relates to a method of removing iron and aluminum impurities from phosphatic materials used in the preparation of potassium phosphate compounds.

Numerous processes have been developed for the preparation of potassium tripolyphosphate, tetrapotassium pyrophosphate and other potassium phosphates suitable for use as a detergent. Generally, the processes are directed to the fusion of relatively pure reactants and subsequently cooling the fused material. In addition, processes have been developed for the preparation of alkali metal phosphates using impure wet process phosphoric acid as the source of phosphate. Wet process phosphoric acid is prepared by reacting phosphate rock with a mineral acid such as sulfuric acid, and leaching the reaction mixture with water to recover a relatively dilute aqueous solution of phosphoric acid. Phosphates of iron and aluminum, which are present in the phosphate rock, are solubilized during the digestion step and recovered as soluble compounds in the dilute phosphoric acid solution. In order to prepare a pure alkali metal phosphate detergent material from wet process phosphoric acid, it is necessary to remove iron and aluminum impurities during the process. Generally, these impurities are removed as phosphate salts, thereby resulting in a substantial loss of phosphate values.

It is a primary object of this invention to overcome the disadvantages and shortcomings of processes heretofore in use for preparing detergent grade potassium phosphates from wet process phosphoric acid.

Another object of the invention is to provide a method of separating iron and aluminum impurities from phosphatic materials in a process of preparing potassium phosphate compounds.

It is another object of this invention to provide a method of preparing crystalline tetrapotassium pyrophosphate, using phosphoric acid containing iron and aluminum impurities as the primary source of phosphate.

Still another object of this invention is to provide a method of preparing crystalline potassium tripolyphosphate, using phosphoric acid containing iron and aluminum impurities as the primary source of phosphate.

Another object of this invention is to provide a method of removing iron and aluminum impurities from reactants in a process for producing tetrapotassium pyrophosphate.

Still another object of this invention is to provide a method fo removing iron and aluminum impurities from reactants in a process for producing potassium tripolyphosphate.

These and other objects of the invention will be apparent to those skilled in the art from the following description.

In this novel process, wet process phosphoric acid containing iron and aluminum impurities is admixed with a potassium salt having an anion which is volatile at elevated temperatures, and the resulting mixture is heated to produce a molten potassium metaphosphate. The molten material is quenched in water, and the resulting solution is hydrolyzed with steam under pressure to convert substantially all of the metaphosphate to the orthophosphate form, yielding a slurry in which the liquid phase is an aqueous monopotassium orthophosphate solution. Precipitation of solid phosphate salts of iron, aluminum and potassium in the monopotassium orthophosphate solution occurs during the hydrolysis step. The resulting slurry is admixed with a siliceous material such as diatomaceous earth in an amount to provide an $SiO_2/Al_2O_3$ molar ratio in the slurry of at least 2:1, and the slurry is filtered. Filter cake from the filtration step is admixed with a strong basic potassium compound in proportions to provide at least 115% of the stoichiometric amount necessary to form tripotassium orthophosphate with phosphate present in the filter cake, and sufficient to adjust the pH of the mixture to above about 10. During the mixing step, substantially all of the iron phosphate is converted to ferric hydroxide. The mixture is heated to form tripotassium orthophosphate, potassium aluminum silicate, and ferric oxide. Solids from the heating step are quenched in water to solubilize the tripotassium orthophosphate. Insoluble ferric oxide and potassium aluminum silicate are separated and discarded. Aqueous tripotassium orthophosphate solution, free of iron and aluminum impurities, is admixed with the aqueous monopotassium orthophosphate solution produced in the hydrolysis step and sufficient potassium hydroxide in proportions to form a mixture having a potassium to phosphorus molar ratio of between about 1.9:1 and about 2.1:1, and preferably between about 1.98:1 and about 2.02:1. The mixture is then heated to form solid crystalline tetrapotassium pyrophosphate suitable for use as a detergent.

More in detail, phosphate rock is digested with a mineral acid such as sulfuric acid and the digest mixture is leached with an aqueous medium to produce an aqueous phosphoric acid solution containing soluble phosphate salts of iron and aluminum. It is preferred to concentrate the phosphoric acid solution by evaporation to between about 50 and about 54% $P_2O_5$ by weight. Generally, the combined weight of iron and aluminum phosphates, determined as the oxides, in a wet process phosphoric acid solution of the above described concentration, is about 5% and may be between about 3 and about 6% by weight.

A potassium salt having an anion which is volatile at elevated temperatures such as potassium chloride, potassium sulfate, potassium nitrate, potassium oxalate and the like, is admixed with the phosphoric acid to provide a potassium to phosphorus molar ratio in the mixture of between about 0.9:1 and about 1:1. It is preferred to use fertilizer grade potassium chloride having a $K_2O$ analysis of between about 55 and about 60% by weight, but other grades of potassium chloride may be used if desired.

The mixture is heated to a temperature between about 1400 and about 2000° F., preferably between about 1600 and about 1800° F., in a suitable heating apparatus such as a rotating kiln to convert the orthophosphate to the metaphosphate form. During the heating step, hydrogen chloride (when potassium chloride is the potassium compound), hydrogen fluoride, and other volatile impurities are driven off. When potassium sulfate is used, oxides of sulfur will be volatilized and when potassium nitrate is used, oxides of nitrogen will be volatilized. After heating the reactants for a period of about 0.5 to about 1 hour, the kiln product is quenched in water, whereby substantially all of the kiln product is solubilized. The resulting aqueous solution, which may or may not contain solid impurities suspended therein, is hydrolyzed in an autoclave at pressures of the order of 100 to 200 pounds per square inch gauge, at temperatures of the order of about 165 to 225° C., for a period of between about 10 and about 30 minutes. During the hydrolysis step, as much as 99% of the potassium metaphosphate is converted to the orthophosphate form as an aqueous solution of monopotassium orthophosphate. During hydrolysis, substantially all of the iron and aluminum impurities are precipitated from the solution as phosphate salts of iron and aluminum. In addition, a small amount of potassium phosphate is precipitated. The slurry produced during the hydrolysis step is admixed with a siliceous material such as finely ground quartz, diatomaceous earth, and the like. Sufficient siliceous material is added to provide an $SiO_2/Al_2O_3$ molar ratio of at least 2:1, and preferably between about 2:1 and about 2.5:1. It is preferred to add diatomaceous earth to the slurry, since this material is not only a source of silica but also is an effective filter aid. After addition of the siliceous material to the slurry, the slurry is filtered to separate aqueous monopotassium phosphate solution from the solids containing iron and aluminum impurities. If desired, the solid phosphate salts of iron, aluminum, and potassium may be separated from the solution and then admixed with a siliceous material in the above described proportions, but it is preferred to add the siliceous material prior to filtration, whereby any filter aid properties inherent in the siliceous material may be utilized in the separation step.

Aqueous monopotassium phosphate solution separated from the solid impurities may be treated as described more fully below. The solid mixture of siliceous material and phosphate salts of iron, aluminum and potassium is admixed with a strongly basic potassium compound to form a substantially homogeneous mixture. Suitable strongly basic potassium compounds include potassium hydroxide, potassium carbonate and the like. It is preferred to use a concentrated aqueous solution of potassium hydroxide, for example, a solution containing between about 40 and about 50% potassium hydroxide by weight, but more dilute or more concentrated solutions may be used if desired. Sufficient strongly basic potassium compound is added to the solids mixture to provide between about 115 and about 125% of the stoichiometric amount necessary to form tripotassium orthophosphate with the phosphate present in the solids mixture. In addition, sufficient strongly basic compound is added to adjust the pH of the mixture to above about 10, in order to obtain maximum conversion of aluminum phosphate to potassium aluminum silicate. After admixing the potassium hydroxide with the solids mixture of siliceous material and phosphates of iron, aluminum, and potassium, the resulting mixture is heated in a suitable heating apparatus such as a rotary kiln at a temperature between about 800 and about 1400° F., and preferably between about 1100 and about 1200° F. for between about 45 and about 75 minutes. During the mixing step, substantially all of the iron phosphate is converted to ferric hydroxide. During the heating step, ferric hydroxide is converted to ferric oxide and substantially all of the aluminum is converted to water insoluble potassium aluminum silicate. Siliceous material in excess of the amount required to form potassium aluminum silicate remains substantially water insoluble after heat treatment. Substantially all of the phosphate originally present in the solids mixture is rendered water soluble during the heating step by forming tripotassium phosphate. If desired, the mixture of solid impurities and strongly basic potassium compound may be heated in a suitable pressure apparatus such as an autoclave at temperatures between about 300 and about 500° F. at pressures between about 150 and about 300 p.s.i.g. for between about 90 and about 150 minutes to convert the phosphate component of the solids to a water soluble form as in the rotary kiln. The product of the heating step, either produced in a rotary kiln at substantially atmospheric pressure or in an autoclave under pressure, as the case may be, is quenched in water and agitated to dissolve substantially all of the water soluble phosphate values. The resulting slurry is subjected to a solids-liquid separation operation, such as filtration or the like. Solids containing water insoluble iron and aluminum compounds are discarded.

The clarified aqueous solution of tripotassium phosphate, which is substantially free of iron and aluminum impurities, is admixed with potassium hydroxide and the clarified aqueous monopotassium phosphate solution from the above described hydrolysis step in proportions to provide a potassium to phosphorus molar ratio of between about 1.9:1 and about 2.1:1 and preferably between about 1.98:1 and about 2.02:1. If desired, potassium carbonate or other strongly basic potassium compound may be used to replace part or all of the KOH used to adjust the K/P molar ratio to the above described ranges. The resulting aqueous solution is then heated in a suitable heating apparatus such as a rotary kiln at temperatures between about 500 and about 1200° F., preferably between about 1000 and about 1200° F., for between about one and about two hours to form solid tetrapotassium pyrophosphate. In a preferred embodiment of the invention, the solution is admixed with previously prepared solid tetrapotassium pyrophosphate by spraying the solution onto a tumbling bed of the solids, and heating the moist solids in a rotating kiln at the above described temperatures and below the fusion point of the solids. A portion of the solid tetrapotassium pyrophosphate produced in the heating step is recycled and contacted with additional aqueous solution as described above. The remainder of the furnace product is cooled in a suitable apparatus such as a rotating cooler and then comminuted to form solid particles, substantially all of which pass through a 20 mesh screen. The comminuted tetrapotassium pyrophosphate produced in this manner is in crystalline form and is particularly suitable for use as a component of liquid detergents, since tetrapotassium pyrophosphate does not hydrolyze in solution as readily as potassium tripolyphosphate.

It will be recognized that the novel process can be modified without departing from the spirit of the invention. For example, after separation of iron and aluminum impurities from the aqueous monopotassium phosphate solution produced in the hydrolysis step, the clarified solution may be evaporated to cause crystallization of monopotassium phosphate. After separation of the crystals, the mother liquor may be recycled to the hydrolysis step. The solid crystals of monopotassium phosphate may then be admixed with aqueous tripotassium phosphate solution and potassium hydroxide to produce tetrapotassium pyrophosphate as described above.

In another embodiment of the invention, aqueous tripotassium phosphate solution, free of iron and aluminum impurities, and monopotassium phosphate prepared as described above may be admixed with a strongly basic potassium compound such as potassium hydroxide in proportions to give a K to P molar ratio of between about 1.5:1 and about 1.7:1. The resulting mixture may then be heated at temperatures between about 1000° F. and about 1200° F. to produce crystalline potassium tripolyphosphate suitable for use as a detergent The invention will be further understood from the following example which is given by way of illustration without any intention that the invention be limited thereto. All parts and percentages are by weight unless otherwise specified.

*Example 1*

Phosphate rock was reacted with aqueous sulfuric acid solution, the reaction mixture was leached with water, and the resulting aqueous phosphoric acid solution was concentrated in a submerged combustion evaporator. Chemical analysis of the phosphoric acid solution was as follows:

| Component: | Percent |
|---|---|
| $P_2O_5$ | 55.2 |
| CaO | 0.364 |
| $Fe_2O_3$ | 2.20 |
| $Al_2O_3$ | 1.68 |
| $SO_4$ | 3.37 |

To 2000 parts of this solution was added 1165 parts of sylvite (59% $K_2O$) and the mixture was heated in a hearth furnace at a temperature of about 1600° F. for about one hour to form a molten mass containing potassium metaphosphate. The molten material was discharged from the furnace and quenched in water to form an aqueous solution of potassium metaphosphate containing soluble iron and aluminum impurities. About 920 parts of this solution was heated in an autoclave at a temperature of about 190° C. and at a pressure of about 150 p.s.i.g. for about 15 minutes, whereby about 98% of the metaphosphate was hydrolyzed to the orthophosphate form. In addition, phosphate salts of iron, aluminum, and potassium were precipitated from solution during the hydrolysis step. About 6.1 parts of a diatomaceous earth filter aid was admixed with the resulting slurry and the slurry was filtered. The clarified aqueous solution of monopotassium phosphate recovered as filtrate was used in a subsequent part of the process. The filter cake from the filter step was admixed with about 110 parts of an aqueous 45% potassium hydroxide solution, and the resulting mixture was heated in a rotary kiln to a temperature of about 600° C. for about one hour. The kiln product was quenched in water, and the resulting slurry was agitated and filtered. The filter cake, containing about 95% of the iron and aluminum impurities, was discarded. About 52 parts of the filtrate, which was essentially a tripotassium phosphate solution, were admixed with about 155 parts of the clarified aqueous monopotassium phosphate solution produced in the hydrolysis step, and about 20 parts of potassium hydroxide as an aqueous 45% KOH solution. The resulting solution was sprayed into a rotary kiln and heated to a temperature of about 1200° F. to form solid particles of tetrapotassium pyrophosphate ($K_4P_2O_7$). The solids were cooled in air and comminuted to form particles substantially all of which passed through a 20 mesh screen. The comminuted product was analyzed chemically and $K_4P_2O_7$ content was determined to be 94% by weight of the total.

The product was treated in accordance with the procedure described in Analytical Chemistry, 18, No. 7, pages 411 to 415, July 1946, to measure its sequestering action. Four grams of solids were dissolved in distilled water and the solution diluted to 250 ml. The dilute solution was filtered to remove insoluble material. Twenty-five milliliters of the filtered solution were diluted to 45 ml. and the pH adjusted to 10 with sodium hydroxide. The pH adjusted solution was transferred to the photoelectric colorimeter and titrated with calcium chloride solution containing 0.25 gram of calcium per 100 ml. of solution, to the cloud point. The product prepared in this example had a calcium value of 6.5.

Having thus described my invention, what I desire to secure by Letters Patent is:

1. The process of preparing crystalline potassium phosphate having a potassium to phosphorus molar ratio between about 1.5:1 and about 2.1:1 from a solid mixture of iron and aluminum phosphates obtained in the production of phosphoric acid which comprises admixing said solid mixture with water, silica in an amount sufficient to provide a $SiO_2/Al_2O_3$ molar ratio in excess of about 2:1, and an amount of a strongly basic potassium compound selected from the group consisting of potassium hydroxide, potassium carbonate, and mixtures thereof, in an amount in excess of 115% of the stoichiometric proportion required to form tripotassium orthophosphate with the phosphate values in said mixture, to adjust the pH of the resulting slurry to above about 10, heating the resulting slurry to a temperature above about 300° F. whereby the phosphate values are converted into water soluble potassium orthophosphates, slurrying the heat-treated material with water to yield an aqueous solution of potassium orthophosphates predominating in tripotassium orthophosphate and containing water insoluble compounds of iron and aluminum, separating said orthophosphate solution from said water insoluble compounds, admixing said separated orthophosphate solution with an aqueous monopotassium orthophosphate solution and a strongly basic compound selected from the group consisting of potassium hydroxide, potassium carbonate and mixtures thereof in proportions to adjust the potassium to phosphate mole ratio of the mixture to between about 1.5:1 and about 2.1:1, and heating the resulting mixture to dryness at a temperature below the fusion temperature of the solids.

2. The process of claim 1 wherein the strongly basic potassium compound is potassium hydroxide.

3. The process of claim 1 wherein sufficient silica is added to said phosphate salts of iron and aluminum to provide a $SiO_2/Al_2O_3$ molar ratio of between about 2:1 and about 2.5:1.

4. The process of claim 1 wherein said mixture of phosphate salts, silica, strongly basic potassium compound and water is heated at a temperature between about 800 and about 1400° F. at substantially atmospheric pressure in a rotary kiln.

5. The process of claim 1 wherein said mixture of phosphate salts, silica, strongly basic potassium compound and water is heated at a temperature between about 300 and about 500° F. at a pressure between about 150 and about 300 pounds per square inch gauge in an autoclave.

6. The method of preparing a crystalline potassium phosphate having a potassium to phosphorus molar ratio between about 1.5:1 and about 2.1:1 from aqueous phosphoric acid solution containing iron and aluminum impurities which comprises admixing said phosphoric acid with a potassium salt selected from the group consisting of potassium chloride, potassium sulfate, potassium nitrate, potassium oxalate, and mixtures thereof, to provide a potassium to phosphorus molar ratio of between about 0.9:1 and about 1.1:1 in the mixture, heating said mixture to a temperature between about 1400 and about 2000° F. to form molten potassium metaphosphate and to volatilize substantially all of the anion of said potassium salt, hydrolyzing said metaphosphate with water to form an aqueous solution of monopotassium orthophosphate containing solid phosphate salts of iron, aluminum and potassium, separating said solid phosphate salts from said solution, preparing a substantially homogeneous mixture by admixing said separated phosphate salts with silica in an amount sufficient to provide a $SiO_2/Al_2O_3$ molar ratio in excess af about 2:1, and an amount of a strongly basic potassium compound selected from the group consisting of potassium hydroxide, potassium carbonate, and mixtures thereof, in an amount in excess of 115% of the stoichiometric proportion required to form tripotassium orthophosphate with the phosphate values in said separated phosphate salts, to adjust the pH of the mixture to above about 10, heating said mixture to a temperature above about 300° F., slurrying the heat-treated material with water to form an aqueous solution of tripotassium orthophosphate containing water insoluble compounds of iron and aluminum, separating said water insoluble compounds from said tripotassium orthophosphate solution, admixing said separated tripotassium orthophosphate solution with said aqueous monopotassium orthophosphate solution and a strongly basic potassium compound selected from the group consisting of potassium hydroxide, potassium carbonate, and mixtures thereof in proportions to adjust the potassium to phosphate molar ratio of the mixture to between about 1.5:1 and about 2.1:1, and heating the resulting mixture to dryness at a temperature below the fusion temperature of the solids.

7. The method of claim 6 wherein sufficient silica is added to said homogeneous mixture to provide an $SiO_2/Al_2O_3$ molar ratio of between about 2:1 and about 2.5:1.

8. The method of claim 6 wherein said strongly basic potassium compound, in each instance, is potassium hydroxide.

9. The method of claim 6 wherein said strongly basic potassium compounds is added to said homogeneous mixture in an amount equivalent to between about 115% and about 125% of the stoichiometric amount necessary to form tripotassium orthophosphate with the phosphate present in said homogeneous mixture.

10. The method of claim 6 wherein said homogeneous mixture is heated at substantially atmospheric pressure at temperatures between about 800° F. and about 1400° F.

11. The method of claim 6 wherein said homogeneous mixture is heated at a pressure between about 150 and about 300 p.s.i.g. and at a temperature between about 300 and about 500° F.

12. The method of preparing crystalline tetrapotassium pyrophosphate from phosphoric acid containing iron and aluminum impurities which comprises admixing said phosphoric acid with potassium chloride in proportions to provide a potassium to phosphorus molar ratio of between about 0.9:1 and about 1.1:1, heating said mixture to a temperature between about 1400 and about 2000° F. to form potassium metaphosphate, hydrolyzing said metaphosphate in an aqueous medium, whereby an aqueous monopotassium orthophosphate solution containing solid phosphate salts of iron, aluminum and potassium is formed, separating said phosphate salts from said solution, admixing said phosphate salts, diatomaceous earth and potassium hydroxide, said diatomaceous earth being added in proportions to provide a $SiO_2/Al_2O_3$ molar ratio of between about 2:1 and about 2.5:1, said potassium hydroxide being added as an aqueous solution containing between about 40 and about 50% KOH by weight in an amount equivalent to between about 115 and about 125% of the stoichiometric amount necessary to form tripotassium orthophosphate with the phosphate present therein, heating said mixture of phosphate salts, diatomaceous earth and potassium hydroxide at a temperature between about 800 and about 1400° F. for between about 45 and about 75 minutes, slurrying said heat-treated mixture in water to yield an aqueous potassium orthophosphate solution, predominating in tripotassium orthophosphate, and insoluble compounds of iron and aluminum, separating said insoluble compounds from said orthophosphate solution, admixing said orthophosphate solution with said monopotassium orthophosphate solution and sufficient potassium hydroxide to provide a potassium to phosphate molar ratio in the solution of between about 1.9:1 and about 2.1:1, admixing said solution with previously prepared tetrapotassium pyrophosphate and heating said mixture to temperatures between about 500 and about 1200° F. for between about 1 and about 2 hours.

13. The method of claim 12 wherein said aqueous monopotassium orthophosphate solution, after separation of said phosphate salts, is evaporated to cause crystallization of solid monopotassium orthophosphate, said solids are separated from the mother liquor, the mother liquor is recycled to the hydrolysis step, and said solids are admixed with said tripotassium orthophosphate and potassium hydroxide.

References Cited in the file of this patent
UNITED STATES PATENTS

| | | |
|---|---|---|
| 1,696,975 | Kothe et al. | Jan. 1, 1929 |
| 1,865,968 | Schuppe | July 5, 1932 |
| 1,925,645 | Pristoupil | Sept. 5, 1933 |
| 2,064,979 | Kaselitz | Dec. 22, 1936 |